US012694902B2

(12) United States Patent (10) Patent No.: US 12,694,902 B2
Nakane et al. (45) Date of Patent: Jul. 28, 2026

(54) BASE MEMBER, SPINDLE MOTOR INCLUDING BASE MEMBER, HARD DISK DRIVE DEVICE, AND METHOD FOR MANUFACTURING BASE MEMBER

(71) Applicant: MINEBEA MITSUMI Inc., Nagano (JP)

(72) Inventors: Junichi Nakane, Kitasaku-gun (JP); Hideaki Showa, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 636 days.

(21) Appl. No.: 18/171,860

(22) Filed: Feb. 21, 2023

(65) Prior Publication Data

US 2023/0290378 A1 Sep. 14, 2023

(30) Foreign Application Priority Data

Mar. 9, 2022 (JP) ................................. 2022-036349

(51) Int. Cl.
| | |
|---|---|
| *G11B 21/16* | (2006.01) |
| *G11B 5/10* | (2006.01) |
| *G11B 33/02* | (2006.01) |
| *G11B 33/12* | (2006.01) |

(52) U.S. Cl.
CPC ................ *G11B 21/16* (2013.01); *G11B 5/10* (2013.01); *G11B 33/02* (2013.01); *G11B 33/124* (2013.01)

(58) Field of Classification Search
CPC ..... G11B 33/02; G11B 33/022; G11B 33/124; G11B 19/2009; G11B 5/105; G11B 5/4813; G11B 5/4806
See application file for complete search history.

(56) References Cited

U.S. PATENT DOCUMENTS

| | | | |
|---|---|---|---|
| 2014/0026397 A1* | 1/2014 | Fujinawa ........... | G11B 19/2009 29/598 |
| 2015/0092299 A1* | 4/2015 | Oh ........................ | F16C 17/107 310/90 |
| 2019/0348071 A1 | 11/2019 | Shi et al. | |
| 2020/0211587 A1* | 7/2020 | Yoshikawa .......... | G11B 5/4813 |

* cited by examiner

*Primary Examiner* — Livius R. Cazan
(74) *Attorney, Agent, or Firm* — Chrisman Gallo Tochtrop LLC

(57) ABSTRACT

A base member includes a projection having a cylindrical shape and projecting in an axial direction and a component placement part. The projection and the component placement part are adjacent to each other via a curved surface part having a first curved surface and a second curved surface. The first curved surface and the second curved surface have a diameter increasing toward the component placement part in the axial direction. The second curved surface is located closer to a side of the component placement part than the first curved surface in the axial direction.

11 Claims, 12 Drawing Sheets

BASE MEMBER, SPINDLE MOTOR INCLUDING BASE MEMBER, HARD DISK DRIVE DEVICE, AND METHOD FOR MANUFACTURING BASE MEMBER

CROSS-REFERENCE TO RELATED APPLICATIONS

This application claims the benefit of priority to Japanese Patent Application Number 2022-036349 filed on Mar. 9, 2022. The entire contents of the above-identified application are hereby incorporated by reference.

TECHNICAL FIELD

The present disclosure relates to, for example, a base member for an electronic device, such as a hard disk drive device, a spindle motor including the base member, a hard disk drive device, and a method for manufacturing the base member.

BACKGROUND

A hard disk drive device is mounted with various components, such as a pivot bearing, a voice coil motor, and a ramp. On a base member of the hard disk drive device, a projecting part for assembling these components may be formed integrally with the base member by casting. After the casting of the base member, an outer peripheral surface of the projection and a placement surface where components are placed are simultaneously finished by, for example, a forming tool.

The forming tool has a tip part having a cylindrical shape and includes cutting tools on a tip surface and an inner peripheral surface of the forming tool, and an arc-like R-chamfered part is formed at an intersection between the cutting tool on the tip surface and the cutting tool on the inner peripheral surface. The forming tool dedicated for each size of the projecting part is prepared.

CITATION LIST

Patent Literature

PTL 1: US 2019/348071 A

SUMMARY

However, the R-chamfered part provided at the forming tool forms an R shape at the lower end of an outer peripheral surface of the projecting part in accordance with the shape of the cutting tool after the finishing. When a component contacts the R shape, the assembly accuracy of the component is reduced.

The finishing using the forming tool as described above needs machining by moving the forming tool up and down for each projecting part. Accordingly, the height of the placement surface (component placement part) where the component of the projecting part is placed is affected by the height positioning accuracy of the forming tool for each projecting part.

Since the forming tool rotating about a central axis of the projecting part is pressed against the placement surface for machining, chatter vibration is likely to occur due to resistance received from a cutting surface. Thus, an undesirable cutting trace may be formed on the placement surface after the finishing. This may be adversely affect the height accuracy due to an increase in surface roughness.

One aspect is to provide a base member capable of improving height accuracy of a component placement part.

In one aspect, a base member includes a projection having a cylindrical shape and projecting in an axial direction and a component placement part. The projection and the component placement part are adjacent to each other via a curved surface part having a first curved surface and a second curved surface. The first curved surface and the second curved surface have a diameter increasing toward the component placement part in the axial direction. The second curved surface is located closer to a side of the component placement part than the first curved surface in the axial direction.

One aspect can improve the height accuracy of the component placement part.

DESCRIPTION OF EMBODIMENTS

Figure 1:
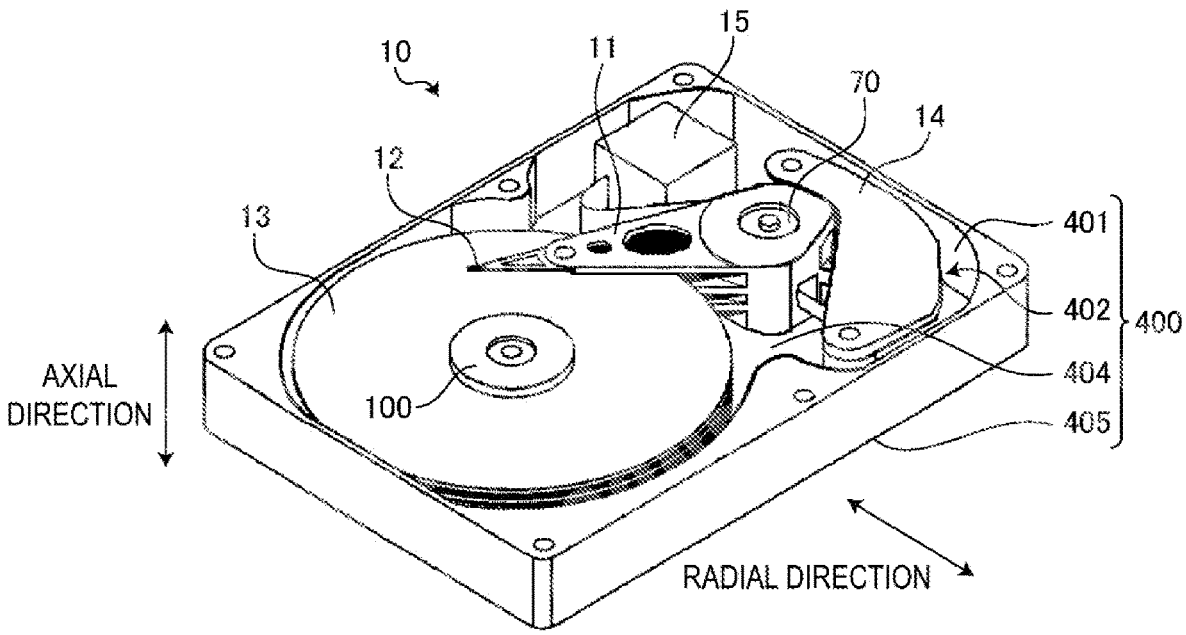
FIG. 1 is a perspective view illustrating an example of a hard disk drive device according to a first embodiment.

Embodiments of a base member disclosed in the present application are described below in detail with reference to the drawings. The dimensional relationship of elements and the ratio of the elements in the drawings may differ from an actual configuration.

First Embodiment

Figure 2:
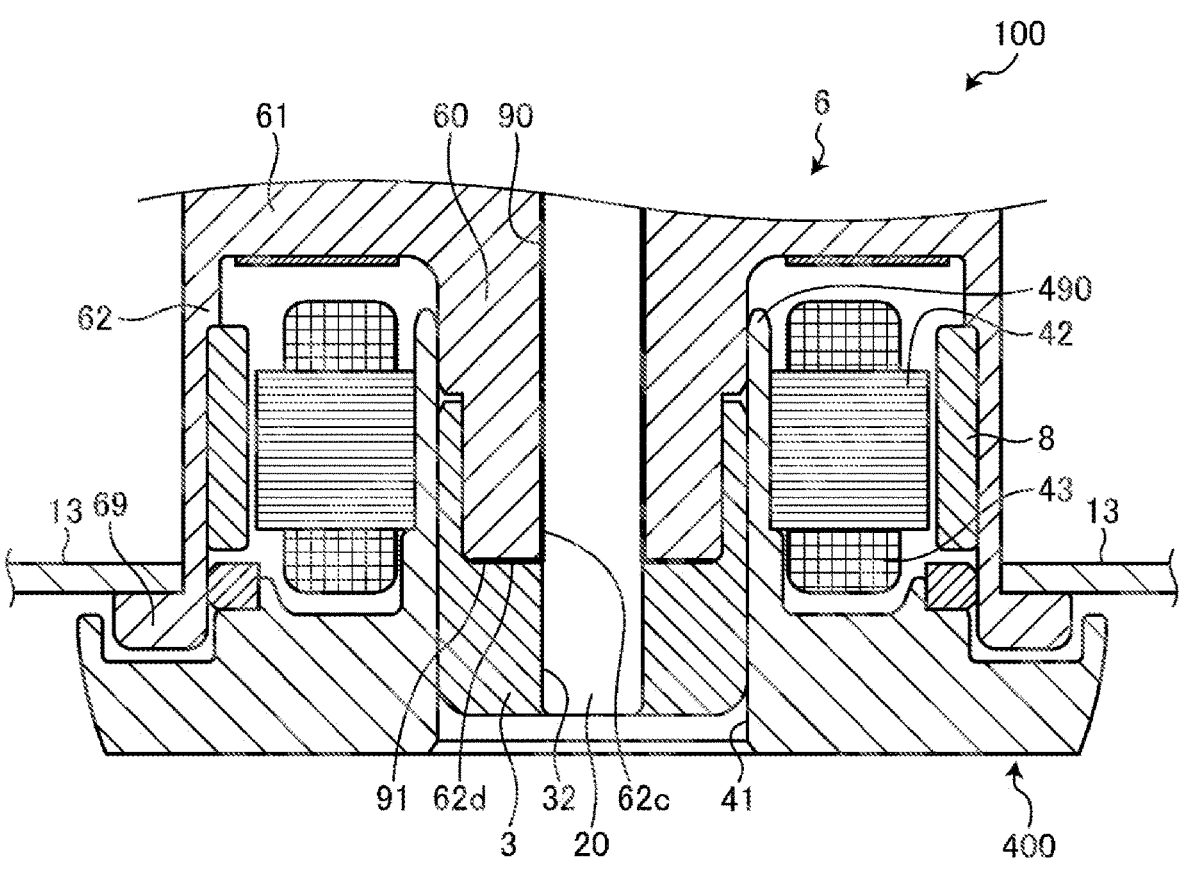
FIG. 2 is a partial cross-sectional view illustrating an example of the hard disk drive device according to the first embodiment.

FIG. 1 is a perspective view illustrating an example of a hard disk drive device according to a first embodiment. FIG. 2 is a partial cross-sectional view illustrating an example of the hard disk drive device according to the first embodiment. FIG. 2 illustrates a state of a cross section taken along a plane including a shaft 20 as a shaft body. In the following description, a direction parallel to a central axis of the shaft 20 may be referred to as an "axial direction" and a direction perpendicular to the central axis of the shaft 20 may be referred to as a "radial direction". An upper side in the axial direction in FIG. 2 may be referred to as "one side in the axial direction", and a lower side in the axial direction in FIG. 2 may be referred to as "the other side in the axial direction".

A hard disk drive device 10 includes a spindle motor 100 configured to rotate a magnetic disk 13. The spindle motor 100 includes a base member 400 constituting a part of a casing. The base member 400 is made of metal (for example, aluminum alloy). A boss part 490 projecting upward in the axial direction over the entire circumference is formed at the center of the base member 400. An opening part 41 is formed at an inner side of the boss part 490 in the radial direction. The magnetic disk 13 is an example of a recording disk.

A stator core 42 is fixed to an outer peripheral side of the boss part 490 of the base member 400. The stator core 42 has a structure with a plurality of plate-shaped soft magnetic materials (for example, electromagnetic steel plates) machined in an annular shape and laminated in the axial direction. The stator core 42 has a plurality of pole teeth (protruding poles) disposed along a circumferential direction and extending outward in the radial direction. Each of pole teeth is wound around with a stator coil 43 serving as a drive coil. The stator core 42 has a function of generating a magnetic flux according to a drive current applied to the stator coil 43.

A bearing constituent member 3 is accommodated in the opening part 41. The bearing constituent member 3 is formed in a cup shape and has an opening part 32 at the center of the bearing constituent member 3. The shaft 20 made of metal is fixed to an inner side of the opening part 32 at the center of the bearing constituent member 3. The shaft 20 rotatably holds a rotor member 6. A screw hole (not illustrated) for coupling the spindle motor 100 to a housing of the hard disk drive device is formed at one end surface of the shaft 20 in the axial direction.

The rotor member 6 is located at an outer side of the shaft 20 in the radial direction and rotates relative to the shaft 20. The rotor member 6 is formed of, for example, ferritic stainless steel as a magnetic body and includes an inner cylindrical wall part 60, a disc part 61, and an outer cylindrical wall part 62. Although the embodiment exemplifies the rotor member 6 with the inner cylindrical wall part 60, the disc part 61, and the outer cylindrical wall part 62 integrally formed, the inner cylindrical wall part 60, the disc part 61, and the outer cylindrical wall part 62 may be formed as separate bodies, or the rotor member 6 may be formed by combining a plurality of members.

The inner cylindrical wall part 60 has a substantially cylindrical shape, and a hole penetrating in the axial direction is formed at the center (part corresponding to the center of rotation) of the inner cylindrical wall part 60. The shaft 20 penetrates the hole. The disc part 61 has a substantially disc-like shape extending outward in the radial direction.

The outer cylindrical wall part 62 has a substantially cylindrical shape extending downward in the axial direction from a peripheral edge of an outer side of the disc part 61 in the radial direction. A rotor magnet 8 opposing the stator core 42 with a gap between the tip parts of the pole teeth of the stator core 42 is disposed at an inner side of the outer cylindrical wall part 62 in the radial direction. The rotor magnet 8 is a permanent magnet having an annular shape and magnetized as S, N, S, N . . . along the circumferential direction.

Periodically switching the polarity of a drive current to be supplied to the stator coil 43 periodically switches a magnetic force generated by the stator coil 43 and a magnetic attraction force and a magnetic repulsion force and the rotor magnet 8 acting between the stator coil 43 and the rotor magnet 8, causing the rotor member 6 to rotate with respect to the stator core 42. An inner circumference of the rotor magnet 8 opposes outer circumferences of the pole teeth of the stator core 42 with a gap. Supplying the stator coil 43 with a drive current generates a driving force rotating the rotor magnet 8, and the rotor member 6 rotates about the shaft 20 with respect to the shaft 20 and the base member 400. This mechanism is similar to a mechanism of a typical spindle motor.

A flange part 69 extending outward in the radial direction is formed at the peripheral edge of a lower end part of the outer cylindrical wall part 62. The flange part 69 serves as a disk placement part for stacking and placing a plurality of the magnetic disks 13. As illustrated in FIG. 2, the magnetic disk 13 is placed on the flange part 69. In the first embodiment, the hard disk drive device 10 includes, for example, seven or more magnetic disks 13. FIG. 2 omits the illustration of some of the magnetic disks 13. In the first embodiment, a gas having a lower density than air, such as helium, is sealed in an internal space of the hard disk drive device 10.

As illustrated in FIG. 1, the base member 400 of the hard disk drive device 10 according to the first embodiment forms a housing 402 with a bottom surface 404 and a wall part 401. The hard disk drive device 10 includes swing arms 11 supporting a plurality of magnetic heads 12 opposing the respective magnetic disks 13, a pivot bearing 70 rotatably supporting the swing arms 11, an actuator 14 configured to drive the swing arm 11, and a control unit 15 configured to control these devices. The hard disk drive device 10 forms the casing with the base member 400 and a cover part (not illustrated) attached to the base member 400 to seal the housing 402. In the first embodiment, the height of the casing is, for example, from 1.5 to 2.0 inches.

Figure 3:
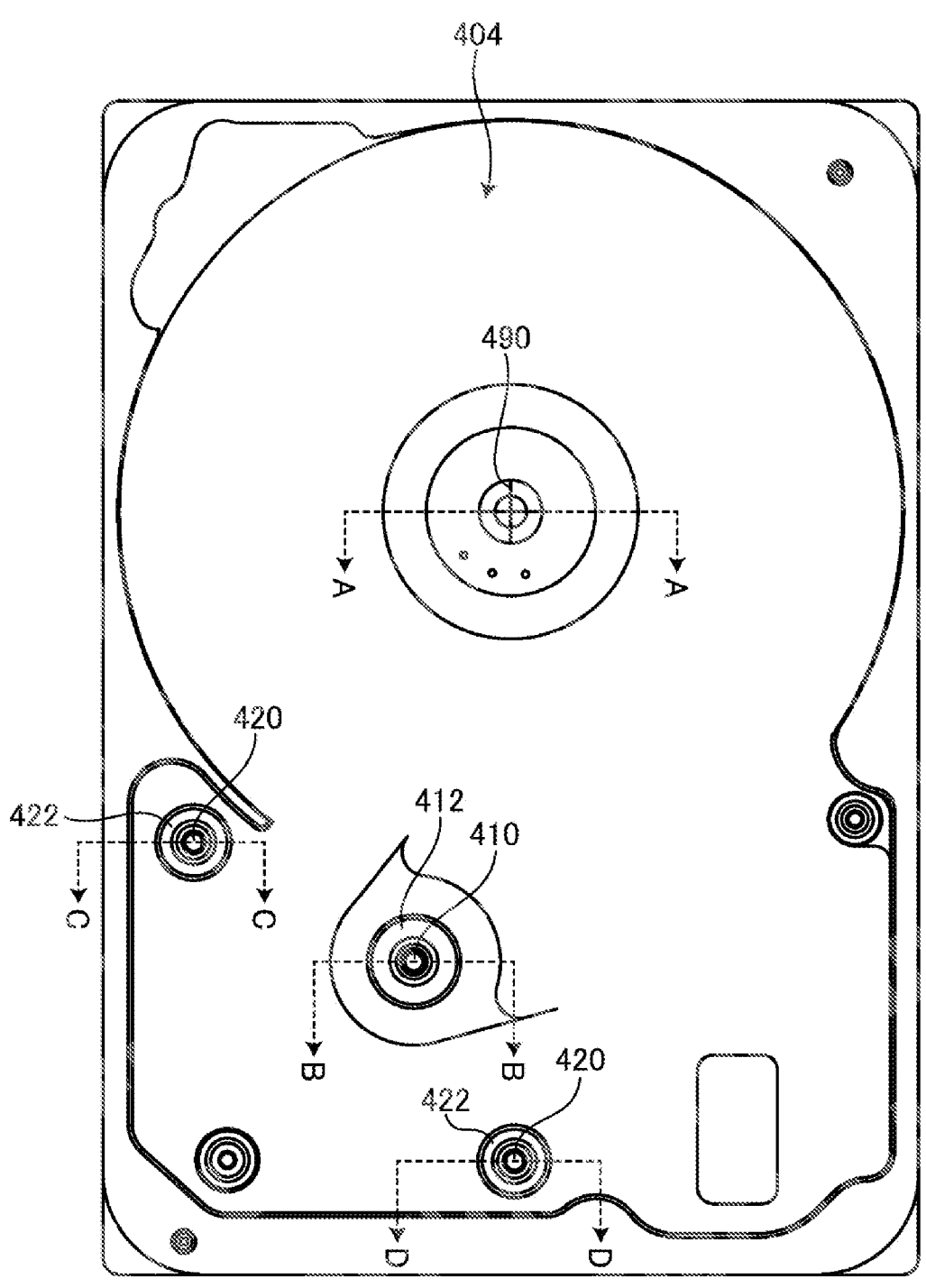
FIG. 3 is a top view illustrating an example of a base member according to the first embodiment.
Figure 4:
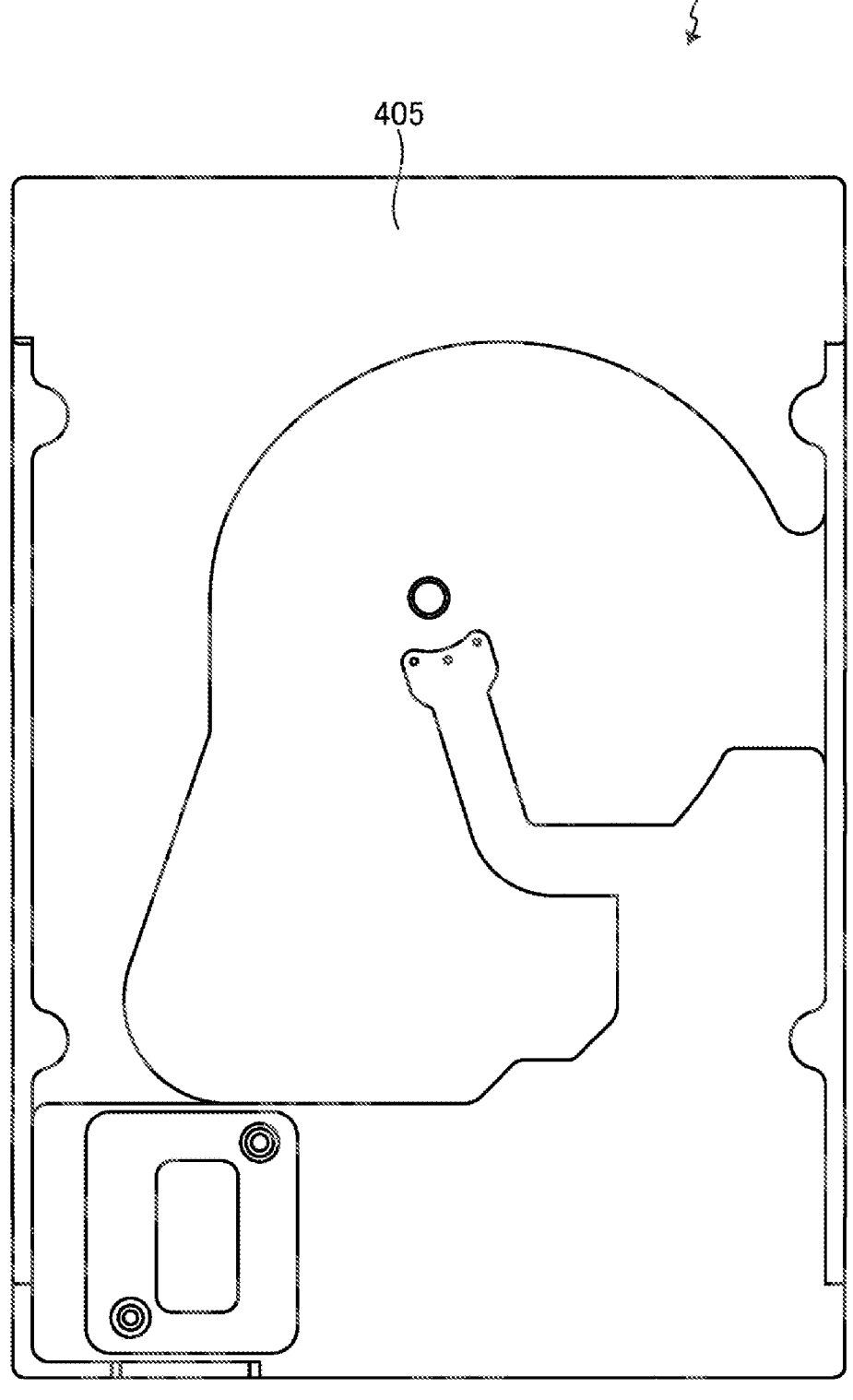
FIG. 4 is a bottom view illustrating an example of the base member according to the first embodiment.

The configuration of the base member 400 will be described. FIG. 3 is a top view illustrating an example of the base member according to the first embodiment, and FIG. 4 is a bottom view illustrating an example of the base member according to the first embodiment. The base member 400 is manufactured by, for example, die casting of aluminum. As illustrated in FIG. 3, various pin parts (projecting parts) 410, 420, and 490 in addition to the boss part 490 are formed integrally with the base member 400 on the bottom surface 404 of the base member 400.

Figure 5:
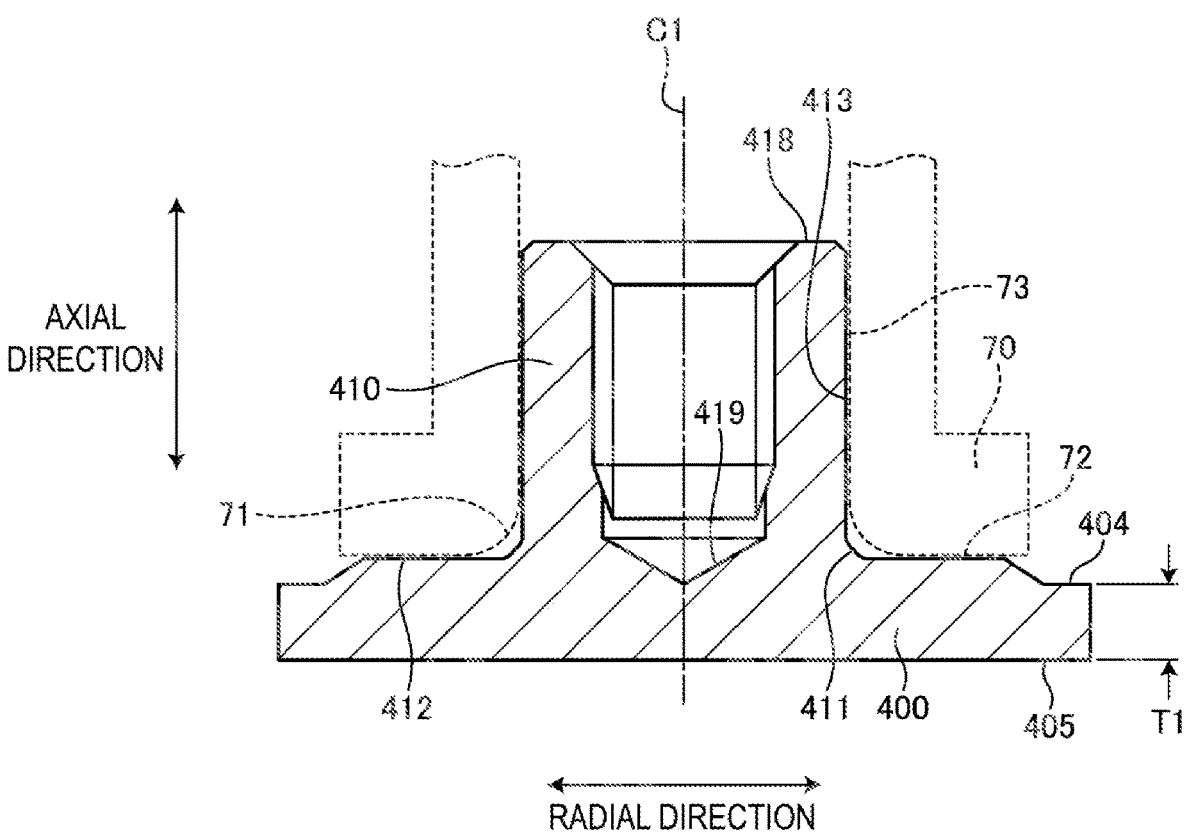
FIG. 5 is a cross-sectional view illustrating an example of a projection according to the first embodiment.

In FIG. 3, the projection 410 is a substantially cylindrical pin part projecting in the axial direction for mounting the pivot bearing 70. FIG. 5 is a cross-sectional view illustrating an example of the projection according to the first embodiment. FIG. 5 illustrates a cross section taken along a line B-B in FIG. 3. As illustrated in FIG. 5, the projection 410 includes an outer peripheral surface 413 and an upper end part 418.

The pivot bearing 70 includes a cylindrical surface 73, a lower surface 72, and a corner part 71. As illustrated in FIG. 5, the corner part 71 is formed between the cylindrical surface 73 and the lower surface 72 and has a diameter continuously changing from one side to the other side in the axial direction, that is, from the cylindrical surface 73 toward the lower surface 72. The pivot bearing 70 is an example of a component. The corner part 71 is, for example, an R part having a cross section formed in a substantially arc shape but, other than the configuration, may be a tapered part having a substantially linear cross-sectional shape.

The outer peripheral surface 413 of the projection 410 extends substantially perpendicular to the bottom surface 404 of the base member 400, that is, in the axial direction. The screw hole 419 for fixing the pivot bearing 70 is formed at the upper end part 418. The height of the projection 410 in the axial direction is, for example, from about 3 cm to 5 cm.

As illustrated in FIG. 5, a placement surface 412 is formed on the outer side of the projection 410 in the radial direction. The placement surface 412 is connected to the outer peripheral surface 413 of the pin part 410 via a curved surface part 411. In the first embodiment, the curved surface part 411 includes another part 452 of an R shape 45 described below and a cutting surface 46. The placement surface 412 is an example of a component placement part. The other part 452 of the R shape 45 is an example of a first curved surface, and the cutting surface 46 is an example of a second curved surface.

In the first embodiment, a thickness T1 of the base member 400 in the axial direction, for example, a distance between a back surface 405 and the bottom surface 404 of the base member 400, is, for example, from 0.5 mm to 4.0 mm, and preferably from 0.75 mm to 2.0 mm.

The placement surface 412 extends substantially parallel to the bottom surface 404, that is, in the radial direction. The placement surface 412 is formed on a side closer to the upper end part 418 of the projection 410 in the axial direction than the bottom surface 404 is. The lower surface 72 of the pivot bearing 70 is placed on the placement surface 412.

Figure 6:
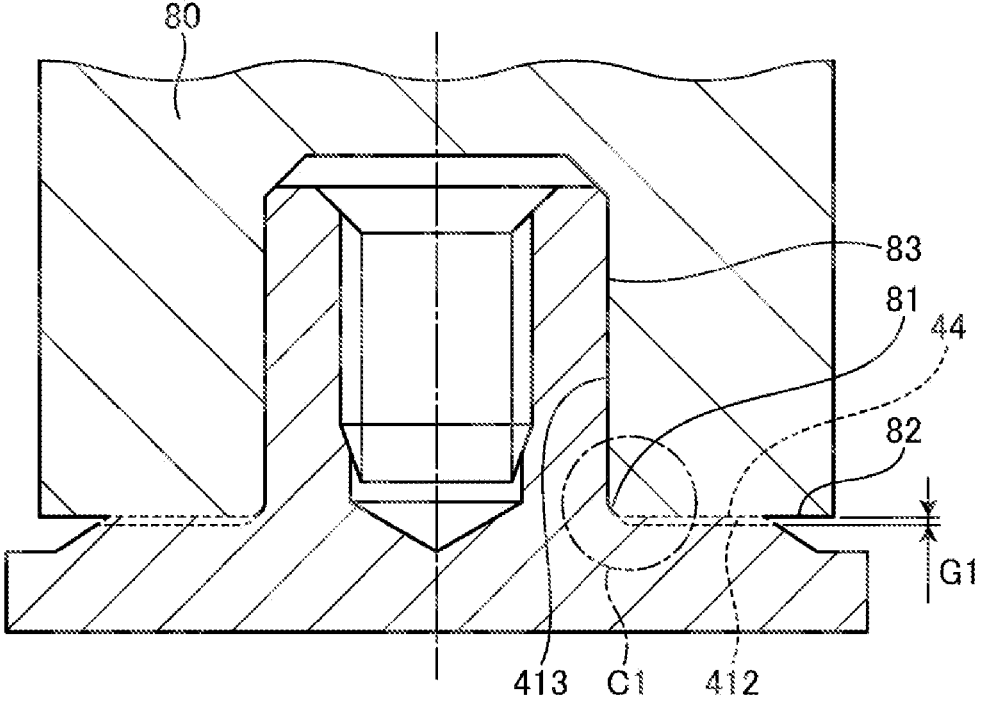
FIG. 6 is a cross-sectional view illustrating an example of a first machining step according to the first embodiment.
Figure 7:
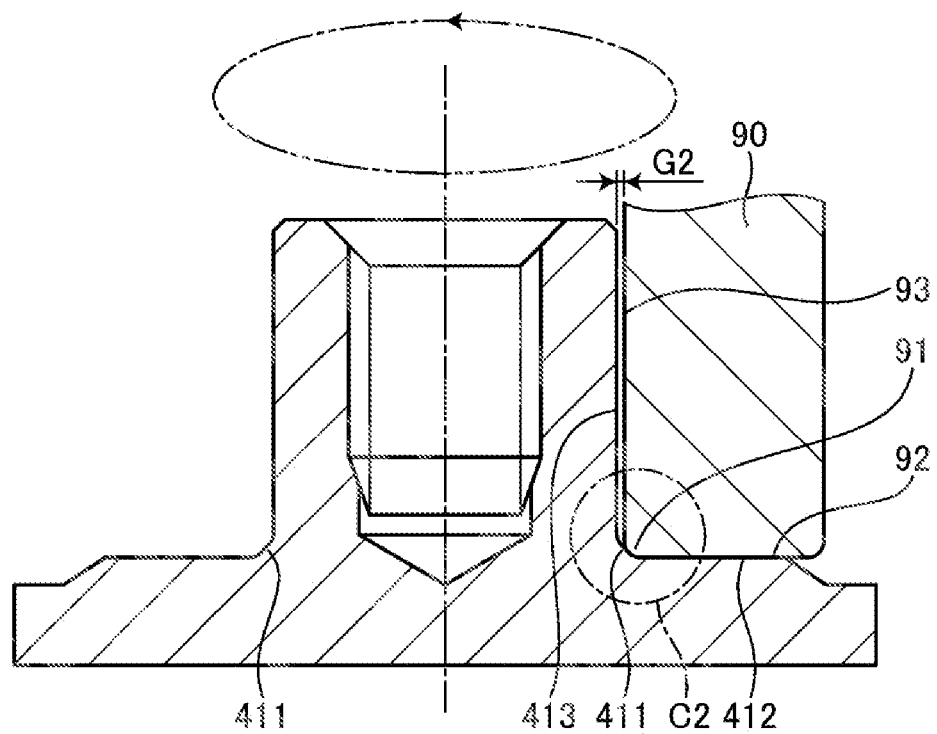
FIG. 7 is a cross-sectional view illustrating an example of a second machining step according to the first embodiment.

The projection 410 illustrated in FIG. 5 is, for example, cast integrally with the base member 400, and then is shaped through a first machining step of cutting the projection 410 with a forming tool 80 illustrated in FIG. 6 and a second machining step of cutting the projection 410 with an end mill 90 illustrated in FIG. 7. FIG. 6 is a cross-sectional view illustrating an example of the first machining step according to the first embodiment, and FIG. 7 is a cross-sectional view illustrating an example of the second machining step. FIGS. 6 and 7 illustrate a cross section taken along the line B-B in FIG. 3.

The forming tool 80 illustrated in FIG. 6 includes a bottom cutting edge 82 on a tip surface of the tip part having a cylindrical shape and an inner peripheral cutting edge 83 on an inner peripheral surface. In the first machining step, when the forming tool 80 is lowered while being rotated with the central axis of the forming tool 80 aligned with the central axis of the pin part 410, the outer peripheral surface of the pin part 410 is cut by an R-chamfered part 81 at an intersection between the inner peripheral cutting edge 83 and the bottom cutting edge 82. The first machining step ends before the bottom cutting edge 82 reaches the placement surface 412. In this case, a cutting surface 44 formed by the bottom cutting edge 82 is separated from a position serving as the placement surface 412 by a distance G1 in the axial direction.

Figure 8:
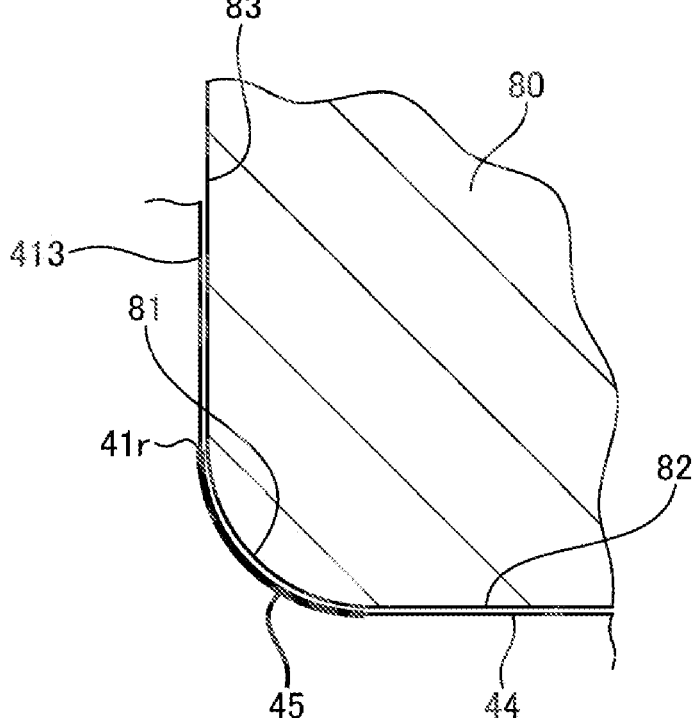
FIG. 8 is an enlarged cross-sectional view illustrating an example of the projection cut in the first machining step according to the first embodiment.

FIG. 8 is an enlarged cross-sectional view illustrating an example of the projection cut in the first machining step according to the first embodiment. FIG. 8 is an enlarged view of a part indicated by a circle C1 in FIG. 6. As illustrated in FIG. 8, the cutting surface in the first machining step includes the R shape 45 corresponding to the R-chamfered part 81 of the forming tool 80. The outer peripheral surface 413 of the projection 410 is formed by the inner peripheral cutting edge 83 of the forming tool 80.

Subsequently, in the second machining step illustrated in FIG. 7, finishing of the placement surface 412 is performed by using the end mill 90. In the second machining step, the base member 400 is mounted on a table of a machining apparatus, the end mill 90 is attached to a chuck, the table is moved up and down, and the end mill 90 is fixed at a set vertical position. While the end mill 90 is rotated, the table is fed in the horizontal direction to approach the placement surface 412, and the placement surface 412 is cut by the bottom cutting edge 92. The movement locus of the end mill 90 with respect to the table is a circumference centered on the central axis of the pin part 410. Subsequently, cutting a top surface of the pin part 410 with the end mill 90 obtains the height accuracy of the pin part 410. In the first embodiment, the end mill 90 does not contact the outer peripheral surface 413 in the radial direction.

Figure 9:
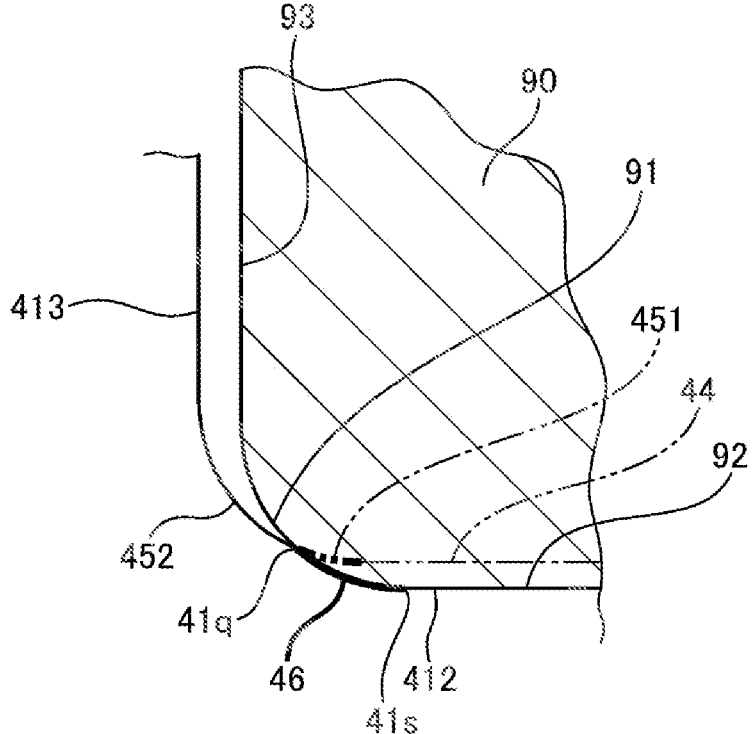
FIG. 9 is an enlarged cross-sectional view illustrating an example of the projection cut in the second machining step according to the first embodiment.

FIG. 9 is an enlarged cross-sectional view illustrating an example of the projection cut in the second machining step. FIG. 9 is an enlarged view of a part indicated by a circle C2 in FIG. 7. As illustrated in FIG. 9, a part 451 of the R shape 45 formed in the first machining step is further cut by an R-chamfered part 91 of the end mill 90. This forms the cutting surface 46. In the second machining step, an inner peripheral cutting edge 93 of the end mill 90 does not contact the outer peripheral surface 413 of the projection 410 in the radial direction, and the outer peripheral surface 413 and the other part 452 of the R shape 45 will not be cut. In this case, the other part 452 serving as the first curved surface and the cutting surface 46 serving as the second curved surface have a substantially arc-like cross-sectional shape as illustrated in FIG. 9 and are formed in an annular shape to surround the pin part 410.

As the first curved surface 452 and the second curved surface 46 approach the outer peripheral surface 413 of the pin part 410 in the radial direction, positions of the first curved surface 452 and the second curved surface 46 in the axial direction approach the upper end part 418 of the pin part 410. In this case, the curved surface part 411 is not formed with a part having a distance from the upper end part 418 in the axial direction larger than a distance to the placement surface 412, such as an undercut part.

Figure 10:
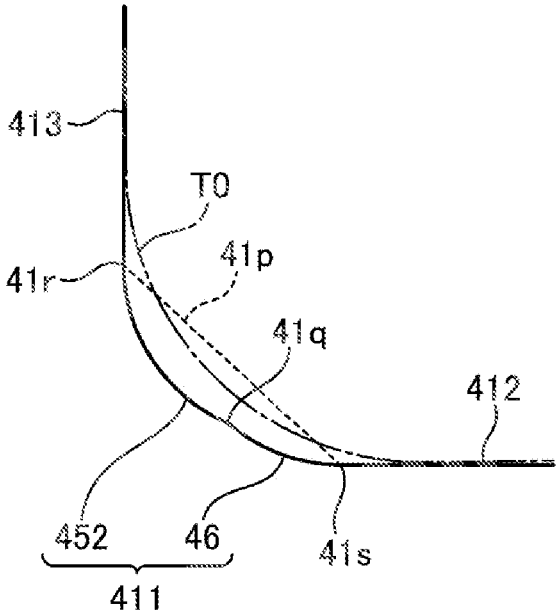
FIG. 10 is an enlarged cross-sectional view illustrating an example of a curved surface part according to the first embodiment.

In the method for manufacturing the base member as described above, the part 451 of the R shape 45 formed at the root of the pin part 410 by the R-chamfered part 81 of the forming tool 80 is cut by the end mill 90. More specifically, as illustrated in FIG. 10, a boundary 41*q* between the first curved surface 452 left uncut on the R shape 45 and the second curved surface 46 formed by the end mill 90 is located inside a substantially truncated cone shape 41*p* formed by a boundary 41*r* between the first curved surface 452 and the outer peripheral surface 413 of the projection 410 and a boundary 41*s* between the cutting surface 46 and the placement surface 412. FIG. 10 is an enlarged cross-sectional view illustrating an example of the curved surface part according to the first embodiment. As illustrated in FIG. 10, the tolerance of the curved surface part 411 after the second machining step falls within the range of a design tolerance TO. In this case, a boundary surface between the cylindrical surface 73 and the corner part 71 of the pivot bearing 70 is located at one side in the axial direction from an upper end of the first curved surface 452, and a boundary surface between the corner part 71 and the lower surface 72 is located at an outer side in the radial direction from a lower end of the cutting surface 46. Consequently, even when a component such as the pivot bearing 70 is mounted on the pin part 410, the corner part 71 of the pivot bearing 70 does not contact the curved surface part 411, allowing the assembly accuracy of the component to be improved.

The placement surface 412 at the outer side of the curved surface part 411 in the radial direction is cut by the end mill 90. The machining with the end mill 90 as described above is less likely to generate chatter vibration, and a good cutting surface with a fine cutting trace can be obtained. The cutting trace is an end mill trace with arcs centered on a point on a circumference centered on the central axis of the pin part 410 continuous along the circumference and has, for example, a twilled shape formed by intersecting a plurality of arcs having substantially the same radius and different center positions. Consequently, the adverse effect on the height accuracy due to roughness of the cutting surface can be prevented. Since the end mill 90 moves on the circumference centered on the central axis of the pin part 410, some of the end mill traces are redundantly formed.

Particularly, in the first embodiment, the placement surface 412 is cut by the end mill 90 after the outer peripheral surface 413 of the projection 410 is cut by the forming tool 80. This allows burrs projecting to the outer peripheral side due to cutting with the forming tool 80 to be removed by the end mill 90 and can enhance the perpendicularity between the placement surface 412 and the pin part 410. Consequently, the first embodiment can be applied to a base member including the lengthened pin part 410 and having a height of a casing reaching 1.5 inches or more, for example, 2 inches. As compared to using the end mill 90, using the forming tool 80 can reduce a difference (variation) in distance between a part farthest from the central axis and a part closest to the central axis at the outer peripheral surface 413 of the pin part 410 illustrated in FIG. 5, that is, can reduce the circularity of the outer peripheral surface 413.

As described above, the base member 400 according to the first embodiment is formed with the projection 410 having a cylindrical shape and projecting in the axial direction and the component placement part 412. The projection 410 and the component placement part 412 are adjacent to each other via the curved surface part 411 having the first curved surface 452 and the second curved surface 46. The first curved surface 452 and the second curved surface 46 have a diameter increasing toward the component placement part 412 in the axial direction, and the second curved surface 46 is located closer to the component placement part 412 side than the first curved surface 452 is in the axial direction. Such a base member 400 is manufactured by a manufacturing method including a molding step of molding a base body including the projection 410 projecting upward by casting, the first machining step of cutting a part from the outer peripheral surface to the outer side in the radial direction of the projection and forming the outer peripheral surface of the projection, and the second machining step of cutting a range of the outer side in the radial direction of the projection by relatively moving a rotary tool including a cutting tool at a lower end surface in the horizontal direction. Such a configuration can improve the height accuracy of the component placement part.

The above embodiment applies the present disclosure to the pin part 410 for mounting the pivot bearing 70. The present disclosure is applicable to any pin part including the boss part 490 and cast integrally with the base member 400 as described below. For example, a case of forming pin parts, such as the plurality of pin parts 420 for a voice coil motor illustrated in FIG. 3, required to have the same dimension of a placement surface 422 in the axial direction will be described.

Second Embodiment

Figure 11:
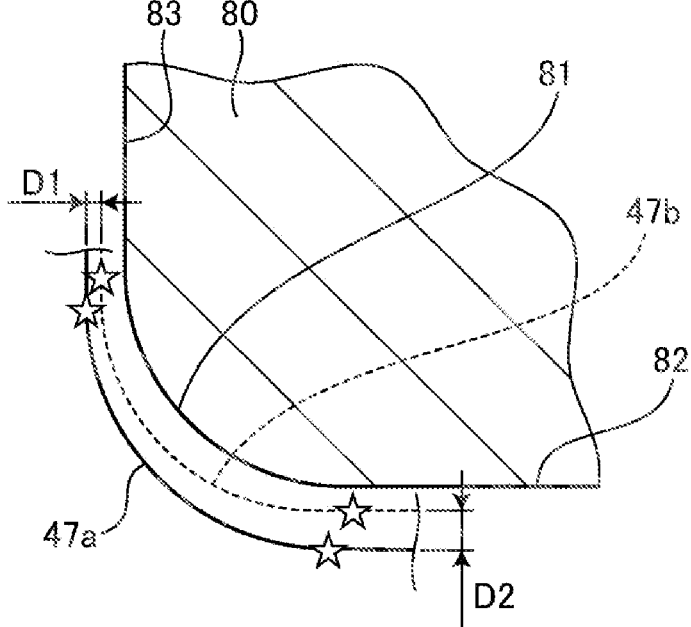
FIG. 11 is an enlarged cross-sectional view illustrating an example of a first machining step for another pin part according to a second embodiment.
Figure 12:
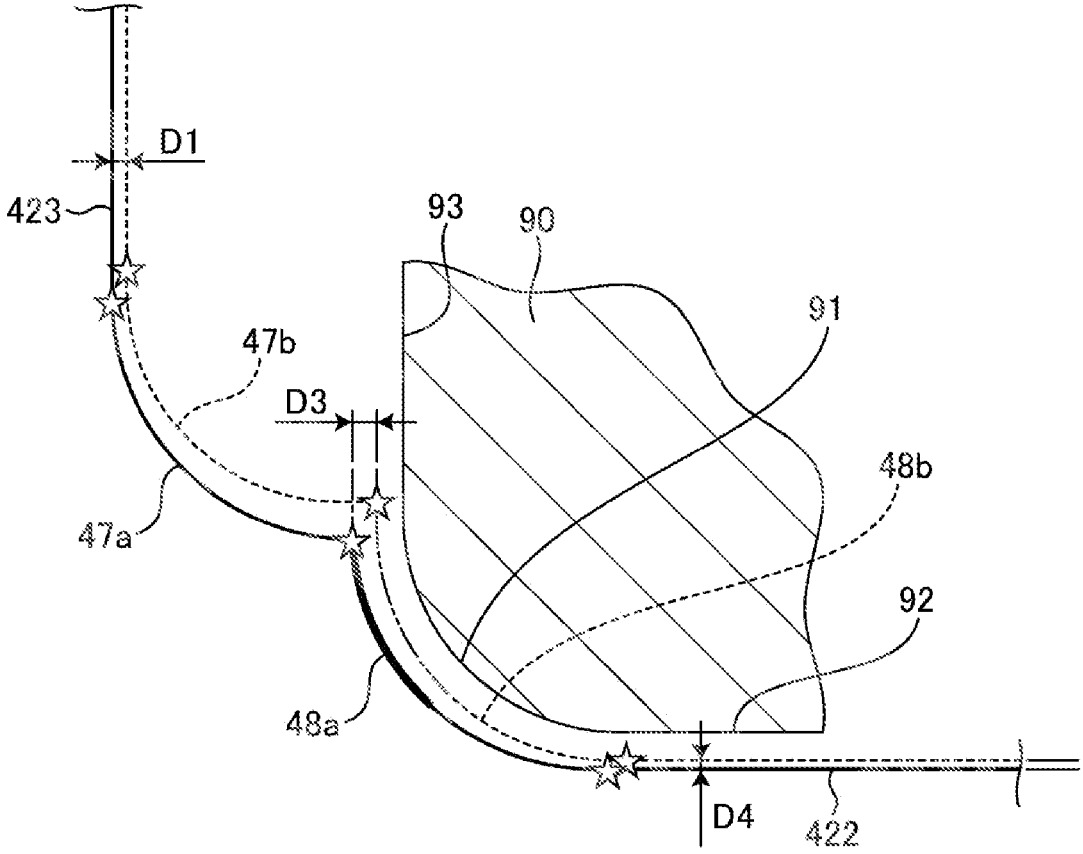
FIG. 12 is an enlarged cross-sectional view illustrating an example of a second machining step for the other pin part according to the second embodiment.

FIG. 11 is an enlarged cross-sectional view illustrating an example of a first machining step for another pin part according to a second embodiment. FIG. 12 is an enlarged cross-sectional view illustrating an example of a second machining step for another pin part according to the second embodiment. In FIGS. 11 and 12, solid lines indicate cross sections of a first curved surface 47a and a second curved surface 48a of a pin part 420 having the shortest distance from a central axis in the radial direction, and broken lines indicate cross sections of a first curved surface 47b and a second curved surface 48b of a pin part 420 having the longest distance.

As illustrated in FIG. 11, in the first machining step using the forming tool 80, an error D1 in the radial direction during cutting work can be reduced. However, in the first machining step, reducing an error D2 in the axial direction is difficult.

On the other hand, as illustrated in FIG. 12, in the second machining step using the end mill 90, machining can be performed without changing the relative vertical position between the end mill 90 and the placement surface 422. This can make an error D4 in height of all the placement surfaces 422 for the pin parts 420 for a voice coil motor smaller than the error D2 in the first machining step, improving the height accuracy.

In each embodiment, the accuracies in the radial direction of the outer peripheral surface 413 of the projection 410 and the outer peripheral surface 423 of the projection 420 are ensured by the forming tool 80 including the inner peripheral cutting edge 83. In this case, as illustrated in FIG. 12, an error D3 in the radial direction due to the end mill 90 in the second machining step may be larger than the error D1 in the radial direction due to the forming tool 80 in the first machining step. For example, in one pin part 420, a difference between a part having a maximum distance from the central axis of the pin part 420 and a part having a minimum distance from the central axis of the pin part 420 at the boundary between the placement surface 422 and the second curved surface may be larger than a difference between a part having a maximum distance from the central axis of the pin part 420 and a part having a minimum distance from the central axis of the pin part 420 at the boundary between the first curved surface and the outer peripheral surface 423 of the pin part 420.

Modifications

The configurations of the present embodiment has been described above, but the embodiment is not limited to these configurations. For example, the configuration illustrated in the embodiment is also applicable to a 2.5-inch thin hard disk drive device. As illustrated in FIG. 10, the first curved surface 452 and the second curved surface 46 are formed continuously in the axial direction and in the radial direction, but the formation is not limited. For example, another curved surface may be further formed between the first curved surface 452 and the second curved surface 46 by further cutting the boundary 41q between the first curved surface 452 and the second curved surface 46.

Although cutting with the forming tool 80 is performed in the first machining step, not only the cutting but cutting with the forming tool 80 after cutting with the end mill 90 first may be performed.

The embodiment and the modifications of the present disclosure have been described, but the present invention is not limited to the embodiment and the modifications but can be variously modified without departing from the spirit of the present invention. Various modifications within a scope not departing from the gist are included in the technical scope of the present disclosure, and this is obvious to a person having skill in the art from the description of the claims.

As described in detail through the embodiments and the like, the detailed description of the invention also describes the invention appended below.

Supplementary Note 1

A base member including:
a projection having a cylindrical shape and projecting in an axial direction; and
a component placement part, wherein
the projection and the component placement part are adjacent to each other via a curved surface part having a first curved surface and a second curved surface,
the first curved surface and the second curved surface have a diameter increasing toward the component placement part in the axial direction, and
the second curved surface is located closer to a side of the component placement part than the first curved surface in the axial direction.

Supplementary Note 2

The base member according to supplementary note 1, wherein the component placement part is formed with a cutting trace including continuous arcs not centered on a central axis of the projection.

Supplementary Note 3

The base member according to supplementary note 2, wherein the component placement part is formed with a part with the cutting trace overlapped.

Supplementary Note 4

The base member according to supplementary note 3, wherein the second curved surface is formed with the cutting trace including the continuous arcs not centered on the central axis of the projection.

Supplementary Note 5

The base member according to any one of supplementary notes 1 to 4, wherein the first curved surface and the second curved surface have a position in the axial direction approaching an upper end part of the projection as the first curved surface and the second curved surface approach the projection in a radial direction.

Supplementary Note 6

The base member according to any one of supplementary notes 1 to 5, wherein the first curved surface and the second curved surface are continuously formed.

Supplementary Note 7

The base member according to any one of supplementary notes 1 to 6, further including
a plurality of combinations of the projection and the component placement part having the substantially same dimension in the axial direction, wherein,
in the plurality of combinations, a difference between a maximum value and a minimum value of a height in the axial direction of a boundary surface between the component placement part and the second curved surface is smaller than a difference between a maximum value and a minimum value of a height in the axial direction of a boundary surface between an outer peripheral surface of the projection and the first curved surface.

Supplementary Note 8

The base member according to supplementary note 7, wherein, in the plurality of combinations, a difference between a maximum value and a minimum value of a distance from the central axis of the projection in the radial direction of a boundary surface between the first curved surface and the second curved surface is larger than a difference between a maximum value and a minimum value of a distance from the central axis of the projection in the radial direction of a boundary surface between the outer peripheral surface of the projection and the first curved surface.

Supplementary Note 9

The base member according to any one of supplementary notes 1 to 8, wherein a difference in distance between a part farthest from the central axis of the projection and a part closest to the central axis of the projection on the outer peripheral surface of the projection is smaller than a difference in distance between a part farthest from the central axis of the projection and a part closest to the central axis of the projection on the boundary surface between the second curved surface and the component placement part.

Supplementary Note 10

The base member according to any one of supplementary notes 1 to 9, wherein the boundary surface between the first curved surface and the second curved surface does not project outward from a substantially truncated cone shape surrounded by a boundary surface between the projection and the first curved surface and the boundary surface between the second curved surface and the component placement part.

Supplementary Note 11

The base member according to any one of supplementary notes 1 to 10, wherein the first curved surface and the second curved surface have a substantially arc-like cross-sectional shape and are formed in an annular shape surrounding the projection.

Supplementary Note 12

The base member according to any one of supplementary notes 1 to 11, wherein a height of a casing is from 1.5 to 2.0 inches.

Supplementary Note 13

A spindle motor including the base member according to any one of supplementary notes 1 to 12.

Supplementary Note 14

A hard disk drive device including:

the spindle motor according to supplementary note 13; and a component having a cylindrical surface accommodating the projection and a lower surface contacting the component placement part, wherein a corner part is formed between the cylindrical surface and the side surface, the corner part having a diameter continuously increasing toward the lower surface, and the corner part is separated from the curved surface part.

Supplementary Note 15

The hard disk drive device according to supplementary note 14, wherein a gas having a lower density than air is sealed in an internal space.

Supplementary Note 16

The hard disk drive device according to supplementary note 14 or 15, further including seven or more of recording disks.

Supplementary Note 17

A method for manufacturing a base member to be a part of a casing of a hard disk drive device, the method including:

a molding step of molding a base body including a projection projecting upward by casting;

a first machining step of cutting a part from an outer peripheral surface to an outer side in a radial direction of the projection and forming the outer peripheral surface of the projection; and a second machining step of cutting a range of the outer side in the radial direction of the projection by relatively moving a rotary tool including a cutting tool at a lower end surface in a horizontal direction.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A base member, comprising:

a plurality of combinations of a projection and a component placement part, the projection having a cylindrical shape and projecting in an axial direction, wherein the projection and the component placement part are adjacent to each other via a curved surface part having a first curved surface and a second curved surface, the first curved surface and the second curved surface have a diameter increasing toward the component placement part in the axial direction, the second curved surface is located closer to a side of the component placement part than the first curved surface in the axial direction the first curved surface is continuous with the second curved surface in the axial direction and in a radial direction, the combinations of the projection and the component placement part having the substantially same dimension in the axial direction, and a difference between a maximum value in the plurality of combinations and a minimum value in the plurality of combinations of a height in the axial direction of a boundary surface between the component placement part and the second curved surface is smaller than a difference between a maximum value in the plurality of combinations and a minimum value in the plurality of combinations of a height in the axial direction of a boundary surface between an outer peripheral surface of the projection and the first curved surface.

2. The base member according to claim 1, wherein the component placement part comprises a cutting trace including continuous arcs not centered on a central axis of the projection.

3. The base member according to claim 2, wherein the second curved surface comprises the cutting trace including the continuous arcs not centered on the central axis of the projection.

4. The base member according to claim 1, wherein the first curved surface and the second curved surface have a position in the axial direction approaching an upper end part of the projection as the first curved surface and the second curved surface approach the projection in the radial direction.

5. The base member according to claim 1, wherein a boundary between the first curved surface and the second curved surface does not project outward from a substantially truncated cone shape surrounded by a boundary between the projection and the first curved surface and a boundary between the second curved surface and the component placement part.

6. The base member according to claim 1, wherein the first curved surface and the second curved surface have a substantially arc-like cross-sectional shape and are formed in an annular shape surrounding the projection.

7. The base member according to claim 1, wherein, a difference between a value largest in the plurality of combinations and a minimum value in the plurality of combinations of a distance from the central axis of the projection in the radial direction of a boundary surface between the first curved surface and the second curved surface is larger than a difference between a maximum value in the plurality of combinations and a minimum value in the plurality of combinations of a distance from the central axis of the projection in the radial direction of a boundary surface between the outer peripheral surface of the projection and the first curved surface.

8. The base member according to claim 1, wherein a height of a casing is from 1.5 to 2.0 inches.

9. A spindle motor comprising the base member according to claim 1.

10. A hard disk drive device comprising the spindle motor according to claim 9.

11. The hard disk drive device according to claim 10, wherein a gas having a lower density than air is sealed in an internal space.

* * * * *